United States Patent
Jeon

(10) Patent No.: US 12,360,209 B2
(45) Date of Patent: Jul. 15, 2025

(54) RADAR CONTROL APPARATUS AND METHOD

(71) Applicant: HL Klemove Corp., Incheon (KR)

(72) Inventor: Seungki Jeon, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 370 days.

(21) Appl. No.: 17/950,876

(22) Filed: Sep. 22, 2022

(65) Prior Publication Data

US 2023/0251369 A1 Aug. 10, 2023

(30) Foreign Application Priority Data

Feb. 10, 2022 (KR) .................. 10-2022-0017410

(51) Int. Cl.
*G01S 7/40* (2006.01)
*G01S 7/41* (2006.01)
(Continued)

(52) U.S. Cl.
CPC ............ *G01S 7/4039* (2021.05); *G01S 7/415* (2013.01); *G01S 13/56* (2013.01); *G01S 13/931* (2013.01); *G01S 2013/93274* (2020.01)

(58) Field of Classification Search
CPC ........ G01S 13/56; G01S 7/415; G01S 13/931; G01S 2013/93274; G01S 7/4039;
(Continued)

(56) References Cited

U.S. PATENT DOCUMENTS 5,959,570 A * 9/1999 Russell ................. G01S 7/4004
700/301
6,469,659 B1 * 10/2002 Lajiness ................ G01S 7/4004
342/91

(Continued)

FOREIGN PATENT DOCUMENTS

WO 2021-028483 A1 2/2021

OTHER PUBLICATIONS

Don Koks, How to Create and Manipulate Radar Range—Doppler Plots, Dec. 2014, DSTO Defence Science and Technology Organisation, p. 21 (Year: 2014).*

(Continued)

*Primary Examiner* — Vladimir Magloire
*Assistant Examiner* — Anna K. Gosling
(74) *Attorney, Agent, or Firm* — Harvest IP Law, LLP

(57) ABSTRACT

The present embodiment relates to a radar control apparatus and a method. More specifically, according to the present embodiment, there is provided a radar control apparatus including: a transmitter/receiver configured to transmit transmission signals used for detecting the vicinity of a host vehicle through a first radar and a second radar mounted to a host vehicle and receive reflected reception signals; a calculator configured to determine a measured value on a reception signal and determine a first relative speed for at least one first measured value determined in a Field Of View (FOV) of the first radar and a second relative speed for at least one second measured value determined in a field of view of the second radar; and a determiner configured to determine states of the first radar and the second radar based on the first relative speed and the second relative speed.

13 Claims, 6 Drawing Sheets

(51) Int. Cl.
*G01S 13/56* (2006.01)
*G01S 13/931* (2020.01)

(58) Field of Classification Search
CPC ........ G01S 13/60; G01S 13/589; G01S 13/87; G01S 7/2883; G01S 7/356; G01S 13/58
See application file for complete search history.

(56) References Cited

U.S. PATENT DOCUMENTS

| | | | |
|---|---|---|---|
| 6,611,227 B1* | 8/2003 | Nebiyeloul-Kifle | G01S 7/412 342/195 |
| 10,890,919 B2* | 1/2021 | Smith | B60W 10/18 |
| 2009/0243912 A1* | 10/2009 | Lohmeier | G01S 13/931 342/70 |
| 2015/0309165 A1* | 10/2015 | Elwart | G01S 13/931 342/61 |
| 2017/0307749 A1 | 10/2017 | Shimizu | |

OTHER PUBLICATIONS

Office Action issued in Korean Patent Application No. 10-2022-0017410 dated Nov. 18, 2024.

\* cited by examiner

RADAR CONTROL APPARATUS AND METHOD

CROSS-REFERENCE TO RELATED APPLICATION

This application claims priority from Korean Patent Application No. 10-2022-0017410, filed on Feb. 10, 2022, which is hereby incorporated by reference for all purposes as if fully set forth herein.

TECHNICAL FIELD

Embodiments relate to a radar control apparatus and a method for estimating an object.

DESCRIPTION OF RELATED ART

Recently, the number of vehicles to which radars are mounted has increased. An electronic control unit of a vehicle can determine a distance, a relative speed, and an angle between an object present in the vicinity of a host vehicle and the host vehicle based on information output from a radar mounted to a vehicle.

In this way, a vehicle to which a radar is mounted can provide various safety functions and convenience functions using a distance, a relative speed, an angle, and the like between an object present in the vicinity of a host vehicle and the host vehicle.

For example, a collision prevention function during stop/parking and a smart cruise function and an automatic parking function during traveling can be performed by perceiving a distance, an angle, or a relative speed between a host vehicle and an object present in the vicinity of the host vehicle using information input from a radar mounted to the vehicle.

In this way, a radar mounted to a vehicle has a significant role for performing various functions, and thus the reliability of information input from the radar is important as well. However, in a case where external substances or objects are present near a radar device, the radar device is blocked, and accuracy and reliability of the radar device may be degraded.

In accordance with this, determination of whether a radar device is in a blockage state needs to be researched and developed.

SUMMARY

In such a background, the present disclosure provides a radar control apparatus and a method for determining states of a first radar and a second radar using a relative speed for an object detected by the first radar and the second radar.

In order to solve the problems described above, according to one aspect of the present disclosure, there is provided a radar control apparatus including: a transmitter/receiver configured to transmit transmission signals used for detecting the vicinity of a host vehicle through a first radar and a second radar mounted to a host vehicle and receive reflected reception signals; a calculator configured to determine a measured value by performing a Fast Fourier Transform (FFT) on a reception signal and determine a first relative speed for at least one first measured value determined in a Field Of View (FOV) of the first radar and a second relative speed for at least one second measured value determined in a field of view of the second radar; and a determiner configured to determine states of the first radar and the second radar based on the first relative speed and the second relative speed.

According to another aspect of the present disclosure, there is provided a radar control method including: transmitting transmission signals used for detecting the vicinity of a host vehicle through a first radar and a second radar mounted to a host vehicle and receiving reflected reception signals; determining a measured value by performing a Fast Fourier Transform (FFT) on a reception signal and determining a first relative speed for at least one first measured value determined in a Field Of View (FOV) of the first radar and a second relative speed for at least one second measured value determined in a field of view of the second radar; and determining states of the first radar and the second radar based on the first relative speed and the second relative speed.

According to the present disclosure, a radar control apparatus and a method can determine blockage of each radar by only comparing object information detected by a first radar and a second radar without determining states of the radars.

DETAILED DESCRIPTION

Figure 1:
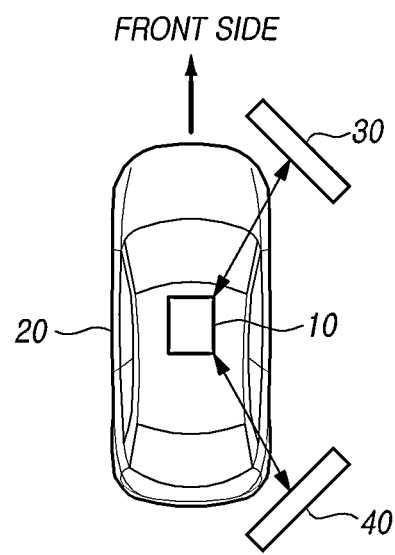
FIG. 1 is a diagram illustrating mounting of a radar control apparatus according to an embodiment of the present disclosure, a first radar, and a second radar to a host vehicle.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating mounting of a radar control apparatus (10) according to an embodiment of the present disclosure, a first radar (30), and a second radar (40) to a host vehicle (20).

Referring to FIG. 1, the radar control apparatus (10) according to the present disclosure, the first radar (30), and the second radar (40) may be mounted to the host vehicle (20). The radar control apparatus (10) may transmit/receive data to/from the first radar (30) and the second radar (40).

For example, the radar control apparatus (10) may perform control of the first radar (30) and the second radar (40) to transmit transmission signals for detecting objects positioned in the vicinity of a host vehicle (20) and receive reception signals received by reflecting the transmission signals on objects.

The radar control apparatus (10) may determine states of the radars by receiving e reception signals from the first radar (30) and the second radar (40) and determining relative speeds based on these.

For this, the radar control apparatus (10) may transmit/receive data to/from each radar through Controller Area Network (CAN) communication, Flexray, or the like.

The radar control apparatus (10) according to an embodiment of the present disclosure may be an Advance Driver Assistance System (ADAS) that provides information assisting traveling of the host vehicle (20) or providing assistance for a driver's controlling the host vehicle (20).

Here, the ADAS may represent any one of various kinds of cutting-edge driver assist systems, and, as driver assist systems, for example, Autonomous Emergency Braking, a Smart Parking Assistance System (SPAS), a Blind Spot Detection (BSD) system, an Adaptive Cruise Control (ACC) system, a Lane Departure Warning System (LDWS), a Lane Keeping Assist System (LKAS), a Lane Change Assist System (LCAS), and the like may be included. However, the ADAS is not limited thereto.

Figure 2:
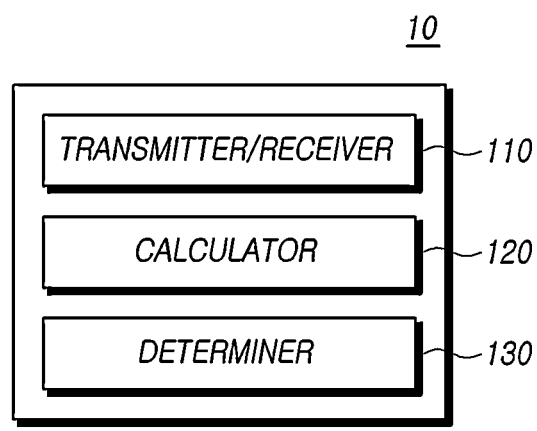
FIG. 2 is a block diagram illustrating a radar control apparatus according to an embodiment of the present disclosure.

FIG. 2 is a block diagram illustrating a radar control apparatus (10) according to an embodiment of the present disclosure.

The radar control apparatus (10) according to an embodiment of the present disclosure may include a transmitter/receiver (110), a calculator (120), a controller, and the like.

The radar control apparatus (10) may receive reception signals from the first radar (30) and the second radar (40), determine relative speeds of the first radar (30) and the second radar (40) with respect to an object for based on the reception signals, and determine states for the first radar (30) and the second radar (40).

The radar control apparatus is mounted to a host vehicle (20) and may detect objects such as a vehicle and a traffic lamp present in the vicinity of the host vehicle (20) based on measured values determined by transmitting and receiving transmission signals and reception signals through the first radar (30) and the second radar (40).

Here, a host vehicle (20) may represent a vehicle that has a motor mounted thereon and is produced to move on the ground by rolling wheels using power of the motor without using railroads or installed lines. In addition, the host vehicle (20) may be an electric vehicle that is a vehicle having electricity as its power and obtains driving energy by rotating a motor using electricity accumulated in a battery instead of obtaining driving energy from combustion of fossil fuel.

The radar control apparatus (10) may be mounted to a manned vehicle in which a driver gets and controls the host vehicle (20) and an autonomous traveling vehicle.

The transmitter/receiver (110) may transmit transmission signals used for detecting the vicinity of the host vehicle (20) through the first radar (30) and the second radar (40) mounted to the host vehicle (20) and receive reflected reception signals.

Here, the first radar (30) may include a first antenna, a first radar transmitter, and a first radar receiver.

The first antenna includes one or more transmission antennas and one or more reception antennas, and each of the transmission/reception antennas may be an array antenna in which one or more radiation elements are connected in series using a power feed line but is not limited thereto.

Such first antenna includes a plurality of transmission antennas and a plurality of reception antennas and may have various forms of an antenna arrangement structure in accordance with an arrangement order, an arrangement interval, and the like thereof.

The first radar transmitter may perform a function of switching to one among a plurality of antennas included in the antenna and transmitting a transmission signal through the switched transmission antenna or transmitting a transmission signal through a multi-transmission channel assigned to a plurality of transmission antennas.

Such a first radar transmitter includes an oscillator that generates a transmission signal for one transmission channel assigned to the switched transmission antenna or a multi-transmission channel assigned to a plurality of transmission antennas. As one example, such an oscillator may include a Voltage-Controlled Oscillator (VCO), an oscillator, and the like.

The first radar receiver may receive a reception signal that is reflected on an object and is received through a reception antenna.

In addition, the first radar receiver may perform a function of switching to one among a plurality of reception antennas and receiving a reception signal that is a reflection signal acquired by reflecting a transmitted transmission signal on a target through the switched reception antenna or receiving a reception signal through a multi-reception channel assigned to a plurality of reception antennas.

Such a first radar receiver may include: a Low Noise Amplifier (LNA) that amplifies reception signals received through one reception channel assigned to a switched reception antenna or received through a multi-reception channel assigned to a plurality of transmission antennas with low noise; a mixer that mixes reception signals that have been amplified with low noise; an amplifier that amplifies a mixed reception signal; an Analog Digital Converter (ADC) that generates reception data by converting the amplified reception signal into a digital signal, and the like.

Similar to the first radar (30) described above, the second radar (40) may include a second antenna, a second radar transmitter, a second radar receiver, and the like. Each of the components of the second radar (40) can perform the same role as that of the first radar (30) described above, and thus description thereof will be omitted for avoiding duplicate description.

The calculator (120) may determine a measured value by performing a Fast Fourier Transform (FFT) on a reception signal and may determine a first relative speed for at least one first measured value determined in a Field Of View (FOV) of the first radar (30) and a second relative speed for at least one second measured value determined in a field of view of the second radar (40).

The calculator (120) may determine a measured value by performing a Fast Fourier Transform (FFT) on a reception signal. More specifically, a measured value may be determined by performing a first-order FFT and converting into a range-time index with respect to frequency and by performing a second-order FFT with respect to time and converting into a range-Doppler index.

Figure 3:
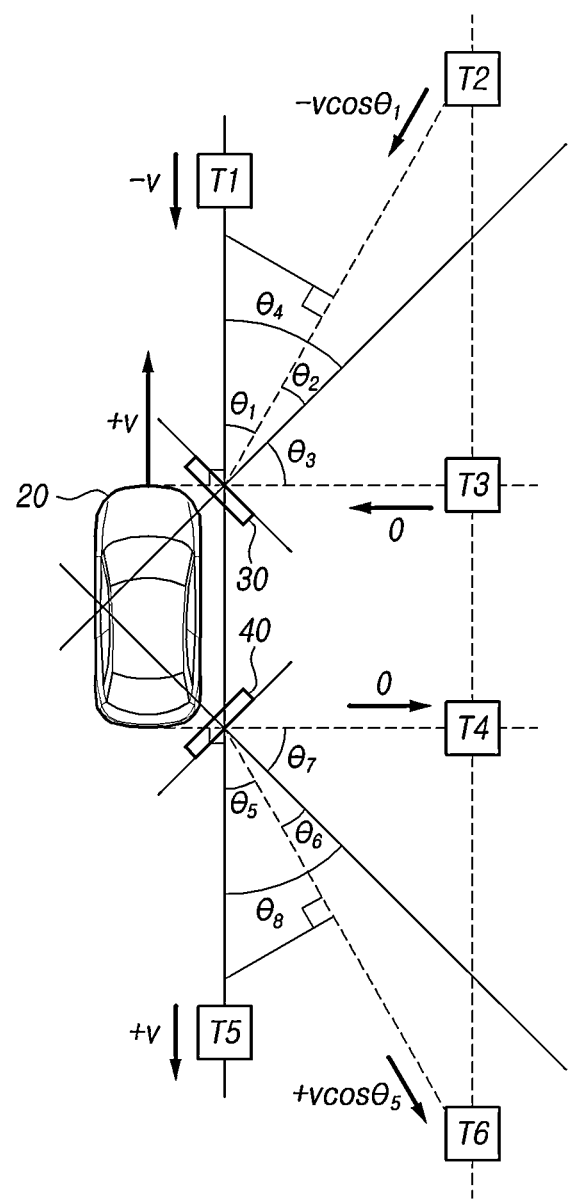
FIG. 3 is a diagram illustrating determination of a relative speed between a stationary object and a host vehicle according to an embodiment.

FIG. 3 is a diagram illustrating determination of a relative speed between a stationary object and a host vehicle (20) according to an embodiment.

Referring to FIG. 3, the calculator (120) can determine a relative speed according to a position for a detected measured value.

The determiner (130) may determine states of the first radar (30) and the second radar (40) based on a first relative speed and a second relative speed.

More specifically, as illustrated in FIG. 3, when the first radar (30) and the second radar (40) are mounted to side faces of the host vehicle (20), and the host vehicle (20) is traveling at a speed v, a stationary object T1 positioned on a vertical line of the first radar (30) with reference to the first radar (30) has an angle formed with a traveling direction of the host vehicle (20) to be 0 degrees, thus a relative speed of the stationary object T1 is determined as −v, and the first radar (30) can detect the stationary object T1 at an angle $\theta_4$. A relative speed of a stationary object T2, which is positioned to form an angle $\theta_1$ with the traveling direction of the host vehicle (20) with reference to the first radar (30) within a field of view of the first radar (30), with respect to the host vehicle (20) may be determined as being −v cos $\theta_1$, and the first radar (30) may detect the stationary object T2 at the angle $\theta_2$. If a stationary object T3 illustrated in FIG. 3 is considered, an angle formed by the traveling direction of the host vehicle (20) and the stationary object T3 is 90 degrees, and thus a relative speed thereof may be determined as being 0. The first radar (30) can detect the stationary object T3 at an angle $\theta_3$.

Similar to the case of the first radar (30), the calculator (120) may also determine a relative speed of a stationary object detected by the second radar (40) with reference to the traveling direction of the host vehicle (20).

For example, a stationary object T4 illustrated in FIG. 3 is detected at an angle $\theta_7$ by the second radar (40), and an angle formed with the traveling direction of the host vehicle (20) with reference to the second radar (40) is 90 degrees, and thus a relative speed thereof may be determined as being 0. As another example, a stationary object T5 illustrated in FIG. 3 is detected at an angle $\theta_8$ by the second radar (40), and an angle formed with the traveling direction of the host vehicle (20) with reference to the second radar (40) is 0 degrees, and thus a relative speed thereof may be determined as being +v. As further another example, a stationary object T6 illustrated in FIG. 3 is detected at an angle $\theta_6$ by the second radar (40), and an angle formed with the traveling direction of the host vehicle (20) with reference to the second radar (40) is $\theta_5$ degrees, and thus a relative speed thereof may be determined as being +v cos $\theta_5$.

Figure 4:
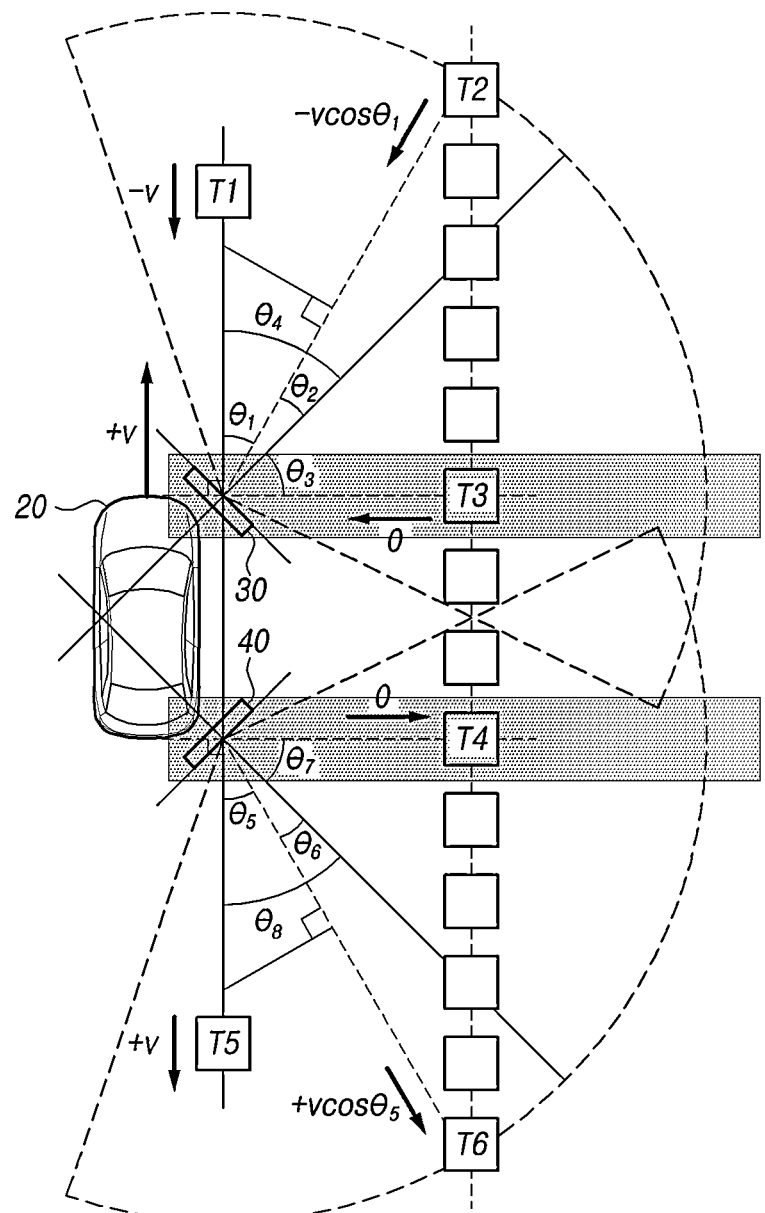
FIG. 4 is a diagram illustrating determination of states of a first radar and a second radar based on a first relative speed and a second relative speed according to an embodiment.

FIG. 4 is a diagram illustrating determination of states of the first radar (30) and the second radar (40) based on a first relative speed and a second relative speed according to an embodiment.

Referring to FIG. 4, in a case where the host vehicle (20) is traveling linearly as described above, and a stationary object such as a guard rail is detected in a direction in which the first radar (30) and the second radar (40) are mounted, a section in which a relative speed determined in a field of view of the first radar (30) and the second radar (40) is 0 may be determined at the stationary objects T3 and T4. Here, in a case where a section in which a relative speed determined based on measured values is 0 is not determined in a situation in which continuous stationary objects are estimated, a blockage phenomenon may occur due to foreign materials such as dust and snow in a specific part of the radar.

Thus, in a case where a section in which a first relative speed and a second relative speed determined based on reception signals of the first radar (30) and the second radar (40) are 0 is determined, the determiner (130) can determine that the first radar (30) and the second radar (40) are normal.

In addition, in a case in which a section in which the first relative speed is 0 is determined, and a section in which the second relative speed is 0 is not determined, the determiner (130) can determine that the second radar (40) is in a blockage state. Since the host vehicle (20) travels to move straight, and a stationary object detected by the first radar (30) is detected by the second radar (40) thereafter in accordance with an arrangement structure of the first radar (30) and the second radar (40), if a section in which the first relative speed determined based on measured values of the first radar (30) is 0 is determined, a section in which the second relative speed determined based on measured values of the second radar (40) that has detected the position is 0 can be also determined. However, if a section in which the second relative speed is 0 is not determined, as described above, the calculator (120) can determine that a blockage state has occurred due to foreign materials in a specific part of the radar.

To the contrary, in a case where a section in which the first relative speed is 0 is not determined, and a section in which the second relative speed is 0 is determined, the determiner (130) can determine that a blockage state has occurred in the first radar (30).

Finally, in a case where no section in which the first relative speed or the second relative speed is 0 is determined by the determiner (130), the determiner (130) may defer the determination of the states of the first radar (30) and the second radar (40) until a section in which the first relative speed or the second relative speed is 0 is determined in a radar detection period thereafter.

For this, the calculator (120) can classify a stationary object positioned in a field of view of the first radar (30) and the second radar (40) based on a first measured value and a second measured value. In a case where a measured value detected in a first period is detected in a second period in accordance with detection periods of the radars, and a position of a measured value detected in the first period and a position of a measured value detected in the second period are within a distance set in advance, the calculator (120) can classify the measured value into a stationary object. Here, the distance set in advance may be differently set in accordance with the speed of the host vehicle (20). In other words, the distance set in advance may be set more widely in a case where the traveling speed of the host vehicle (20) is high, and the distance set in advance may be set more narrowly in a case where the host vehicle (20) stops. As another example, in a case where other measured values positioned within a distance set in advance from a specific measured value are traced in accordance with a traveling speed of the host vehicle (20) and are continuously detected at a specific position, the calculator (120) can classify a plurality of measured values that are continuously detected at the specific position into a stationary object.

According to the description presented above, the radar control apparatus (10) according to the present disclosure can determine states of the first radar (30) and the second radar (40) through relative speeds determined using reception signals of each radar.

The determiner (130) may determine states of the first radar (30) and the second radar (40) based on relative speeds of a first measured value determined by the first radar (30) and a second measured value determined by the second radar (40) or may determine states of the first radar (30) and the second radar (40) based on a relative speed of a measured value determined at the stationary object classified as described above.

The determiner (130) may determine states of the first radar (30) and the second radar (40) described above based on a first reception signal power corresponding to a first angle formed by the traveling direction of the host vehicle (20) and the position of a stationary object with reference to the first radar (30) and a second reception signal power corresponding to a second angle formed by the traveling direction of the host vehicle (20) and the position of a stationary object with reference to the second radar (40).

Referring to FIG. 4, for example, the states of the first radar (30) and the second radar (40) may be determined based on a first reception signal power that is determined by the first radar (30) detecting a stationary object T3 at a first angle, that is, 90 degrees and a second reception signal power determined when an angle formed by the position of the stationary object T3 detected by the second radar (40) in accordance with the movement of the stationary object T3 according to traveling of the host vehicle (20) and the traveling direction of the host vehicle (20) with reference to the second radar (40) is 90 degrees.

In a case where the first reception signal power and the second reception signal power determined as described above are within a value set in advance, the determiner (130) may determine that the first radar (30) and the second radar (40) are normal.

Such comparison is not limited to a specific angle as long as a reference angle is present within a field of view of the first radar (30) and the second radar (40).

According to the description presented above, the radar control apparatus (10) according to the present disclosure can determine the states of the first radar (30) and the second radar (40) by comparing reception signal powers with each other.

Such a radar control apparatus (10) may be realized using an Electronic Controller unit (ECU), a microcomputer, or the like.

In one embodiment, a computer system (not illustrated) such as the radar control apparatus (10) may be realized using an electronic control unit. The electronic control unit may include one or more processors and at least one or more elements among a memory, a storage, a user interface inputter, and a user interface outputter, and these can communicate with each other through a bus. In addition, the computer system may include a network interface for connection to a network. The processor may be a CPU or a semiconductor element that executes processing commands stored in the memory and/or the storage. The memory and the storage may include various types of volatile/nonvolatile storage media. For example, the memory may include a ROM and a RAM.

Hereinafter, a radar control method using the radar control apparatus (10) that is capable of performing all the disclosures described above will be described.

Figure 5:
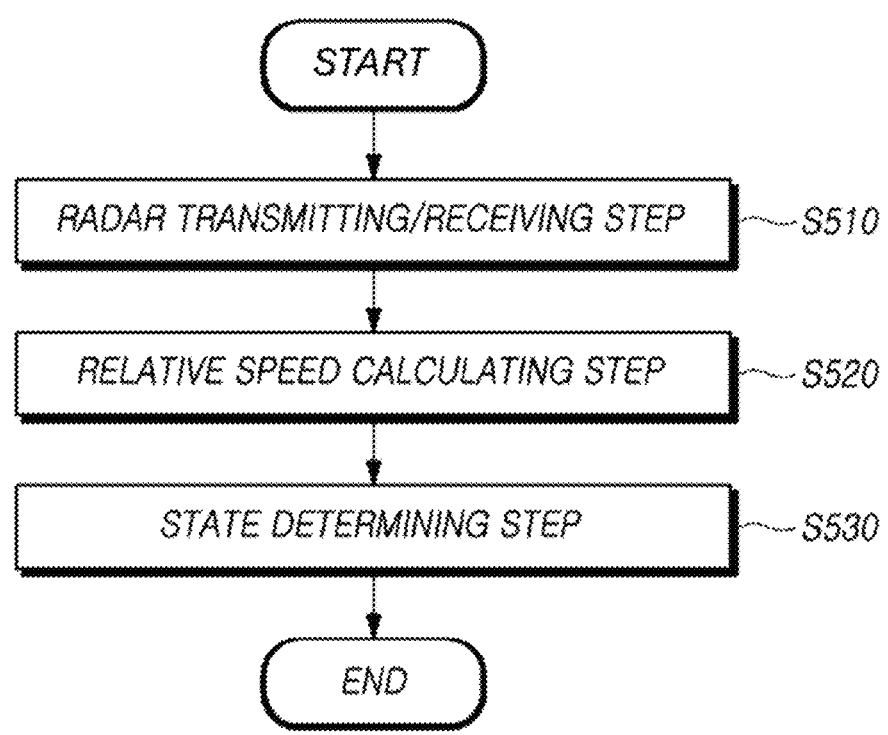
FIG. 5 is a flowchart illustrating a radar control method according to an embodiment of the preset disclosure.

FIG. 5 is a flowchart illustrating a radar control method according to an embodiment of the preset disclosure.

Referring to FIG. 5, a radar control method according to the present disclosure may include: a radar transmitting/receiving step (S510) of transmitting transmission signals used for detecting the vicinity of a host vehicle (20) through a first radar (30) and a second radar (40) mounted to a host vehicle (20) and receiving reflected reception signals; a relative speed determining step (S520) of determining a measured value by performing a Fast Fourier Transform (FFT) on a reception signal and determining a first relative speed for at least one first measured value determined in a Field Of View (FOV) of the first radar (30) and a second relative speed for at least one second measured value determined in a field of view of the second radar (40); and a state determining step (S530) of determining states of the first radar (30) and the second radar (40) based on the first relative speed and the second relative speed.

Here, the first radar (30) and the second radar (40) may be mounted to side faces of the host vehicle (20).

In the state determining step (S530), the states of the first radar (30) and the second radar (40) may be determined based on a first reception signal power corresponding to a first angle formed by the traveling direction of the host vehicle (20) and the position of a stationary object with reference to the first radar (30) and a second reception signal power corresponding to a second angle formed by the traveling direction of the host vehicle (20) and the position of a stationary object with reference to the second radar (40).

Then, in the state determining step (S530), in a case where the first reception signal power and the second reception signal power are within a value set in advance, it may be determined that the first radar (30) and the second radar (40) are normal. Here, the first angle and the second angle may be the same. In other words, reception signal powers for stationary objects positioned at the same angle with reference to the traveling direction of the host vehicle (20) are compared with each other in the radars, and if the powers are within a similar range, it may be determined that the first radar (30) and the second radar (40) are normal.

Then, in a case where a difference between the first reception signal power and the second reception signal power exceeds a value set in advance, the radar control apparatus (10) may determine a radar having a high reception signal power value to be normal and may determine that a blockage phenomenon has occurred in a radar having a low reception power signal value. In addition, by setting a reference reception signal power value, in a case where the first reception signal power value and the second reception signal power value do not exceed the reference reception signal power value, it can be determined that a blockage phenomenon has occurred in the first radar (30) and the second radar (40).

Figure 6:
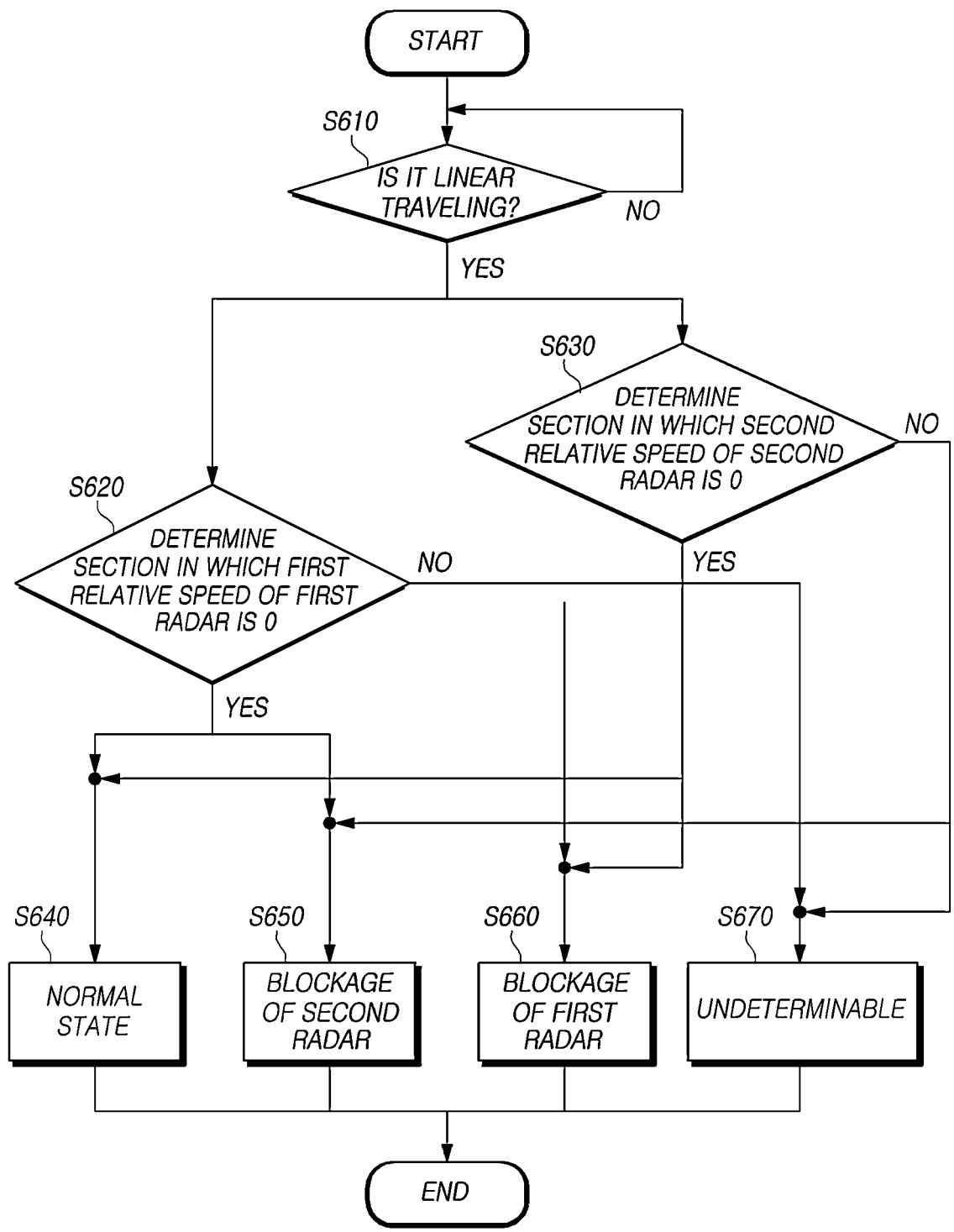
FIG. 6 is a flowchart illustrating Step S630 according to an embodiment more specifically.

FIG. 6 is a flowchart illustrating Step S630 according to an embodiment more specifically.

Referring to FIG. 6, the radar control apparatus (10) may determine whether the host vehicle (20) is traveling linearly (S610). Steering information for the host vehicle (20) may be directly received from a steer mounted to the host vehicle (20) and be used for determining linear traveling of the host vehicle (20), or steering information of the host vehicle (20) acquired by gathering information of each steer may be received by an additional steering control apparatus, and linear traveling may be determined based on this.

In a case where it is determined that the host vehicle (20) is traveling linearly (Yes in S610), the radar control apparatus (10) may determine whether a section in which the first relative speed of the first radar (30) is 0 is determined (S620). More specifically, the radar control apparatus (10) may determine a measured value from a reception signal and determine a relative speed for each measured value based on the determined measured values. Then, the radar control apparatus (10) may determine whether a section in which the relative speed is 0 among the first relative speeds determined within the field of view of the first radar (30) is determined. In one embodiment, the radar control apparatus (10) may determine whether a reflection object is a stationary object or a moving object based on the determined measured value and may determine a section in which the relative speed is 0 described above and determine whether there is a stationary object detected in the section in which the relative speed is 0.

In addition, in a case where it is determined that the host vehicle (20) is traveling linearly (Yes in S610), the radar control apparatus (10) may determine whether a section in which the second relative speed of the second radar (40) is 0 is determined (S630). Similar to the first relative speed of the first radar (30) described above, as the second relative speed, a relative speed for each measured value may be determined based on determined measured values, and the radar control apparatus (10) may determine whether a section in which the relative speed is 0 among the second relative speeds determined within the field of view of the second radar (40) is 0 is determined.

In a case in which a section in which the first relative speed is 0 is determined (Yes in S620), and a section in which the second relative speed is 0 is determined (Yes S630), the radar control apparatus (10) may determine that the first radar (30) and the second radar (40) are in a normal state (S640).

In a case where a section in which the first relative speed is 0 is determined (Yes in S620), and a section in which the second relative speed is 0 is not determined (No in S630), the radar control apparatus (10) may determine that the first radar (30) is in the normal state and the second radar (40) is in a blockage state (S650).

In a case where a section in which the first relative speed is 0 is not determined (No in S620), and a section in which the second relative speed is 0 is determined (Yes in S630), the radar control apparatus (10) may determine that the first radar (30) is in the blockage state and the second radar (40) is in the normal state (S660).

In a case where a section in which the first relative speed is 0 is not determined (No in S620), and a section in which the second relative speed is 0 is not determined (No in S630), the radar control apparatus (10) may defer determination for the first radar (30) and the second radar (40) until a reception signal is received, and a relative speed for each measured value is determined in the next detection period (S670).

As described above, according to the present disclosure, a radar control apparatus and a method can determine blockage of each radar only by comparing object information detected by the first radar and the second radar without determining a state of each radar.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

EXPLANATION OF REFERENCES

10: radar control apparatus
20: host vehicle
30: first radar
40: second radar
110: transmitter/receiver
120: calculator
130: determiner

What is claimed is:

1. A radar control apparatus comprising:
a transmitter/receiver configured to transmit transmission signals used for detecting the vicinity of a host vehicle through a first radar and a second radar mounted to a host vehicle and receive reflected reception signals;
a calculator configured to determine a measured value by performing a Fast Fourier Transform (FFT) on a reception signal and determine a first relative speed for at least one first measured value determined in a Field Of View (FOV) of the first radar and a second relative speed for at least one second measured value determined in a field of view of the second radar; and
a determiner configured to determine states of the first radar and the second radar based on the first relative speed and the second relative speed,
wherein, if there is a section in which the first relative speed and the second relative speed are 0, the determiner determines that the first radar and the second radar are unblocked.

2. The radar control apparatus according to claim 1, wherein the first radar and the second radar are mounted to side faces of the host vehicle.

3. The radar control apparatus according to claim 1, wherein, if there is a section in which the first relative speed is 0, and there is no section in which the second relative speed is 0, the determiner determines that the second radar is in a blockage state.

4. A radar control apparatus comprising: a transmitter/receiver configured to transmit transmission signals used for detecting the vicinity of a host vehicle through a first radar and a second radar mounted to a host vehicle and receive reflected reception signals; a calculator configured to determine a measured value by performing a Fast Fourier Transform (FFT) on a reception signal and determine a first relative speed for at least one first measured value determined in a Field Of View (FOV) of the first radar and a second relative speed for at least one second measured value determined in a field of view of the second radar; and a determiner configured to determine states of the first radar and the second radar based on the first relative speed and the second relative speed, wherein the calculator classifies a stationary object positioned in the fields of view of the first radar and the second radar based on the first measured value and the second measured value, and wherein the determiner determines the states of the first radar and the second radar based on relative speeds for the stationary object, wherein, in a case where the first relative speed determined by the first radar detecting the stationary object and the second relative speed determined by the second radar detecting the stationary object are within a speed set in advance, the determiner determines that the first radar and the second radar are unblocked.

5. The radar control apparatus according to claim 4, wherein the determiner determines the states of the first radar and the second radar based on a first reception signal power corresponding to a first angle formed by a traveling direction of the host vehicle and a position of the stationary object with reference to the first radar and a second reception signal power corresponding to a second angle formed by the traveling direction of the host vehicle and the position of the stationary object with reference to the second radar.

6. The radar control apparatus according to claim 5, wherein, in a case where the first reception signal power and the second reception signal power are within a value set in advance, the determiner determines that the first radar and the second radar are unblocked.

7. A radar control method comprising:
transmitting transmission signals used for detecting the vicinity of a host vehicle through a first radar and a second radar mounted to a host vehicle and receiving reflected reception signals;
determining a measured value by performing a Fast Fourier Transform (FFT) on a reception signal and determining a first relative speed for at least one first measured value determined in a Field Of View (FOV) of the first radar and a second relative speed for at least one second measured value determined in a field of view of the second radar; and
determining states of the first radar and the second radar based on the first relative speed and the second relative speed,
wherein, in the determining of states, if there is a section in which the first relative speed and the second relative speed are 0, it is determined that the first radar and the second radar are unblocked.

8. The radar control method according to claim 7, wherein the first radar and the second radar are mounted to side faces of the host vehicle.

9. The radar control method according to claim 7, wherein, in the determining of states, if there is a section in which the first relative speed is 0, and there is no section in which the second relative speed is 0, it is determined that the second radar is in a blockage state.

10. The radar control method according to claim 7,
wherein, in the determining of a first relative speed and a second relative speed, a stationary object positioned in the fields of view of the first radar and the second radar is classified based on the first measured value and the second measured, value, and
wherein, in the determining of states, the states of the first radar and the second radar are determined based on relative speeds for the stationary object.

11. The radar control method according to claim 10, wherein, in the determining of states, in a case where the first relative speed determined by the first radar detecting the stationary object and the second relative speed determined by the second radar detecting the stationary object are within a speed set in advance, it is determined that the first radar and the second radar are unblocked.

12. The radar control method according to claim 10, wherein, in the determining of states, the states of the first radar and the second radar are determined based on a first reception signal power corresponding to a first angle formed by a traveling direction of the host vehicle and a position of the stationary object with reference to the first radar and a second reception signal power corresponding to a second angle formed by the traveling direction of the host vehicle and the position of the stationary object with reference to the second radar.

13. The radar control method according to claim 12, wherein, in the determining of states, in a case where the first reception signal power and the second reception signal power are within a value set in advance, it is determined that the first radar and the second radar are unblocked.

* * * * *